Nov. 30, 1954  J. H. LUNDY  2,695,680
AIR PRECONDITIONER FOR INTERNAL-COMBUSTION ENGINES
Filed Feb. 28, 1949
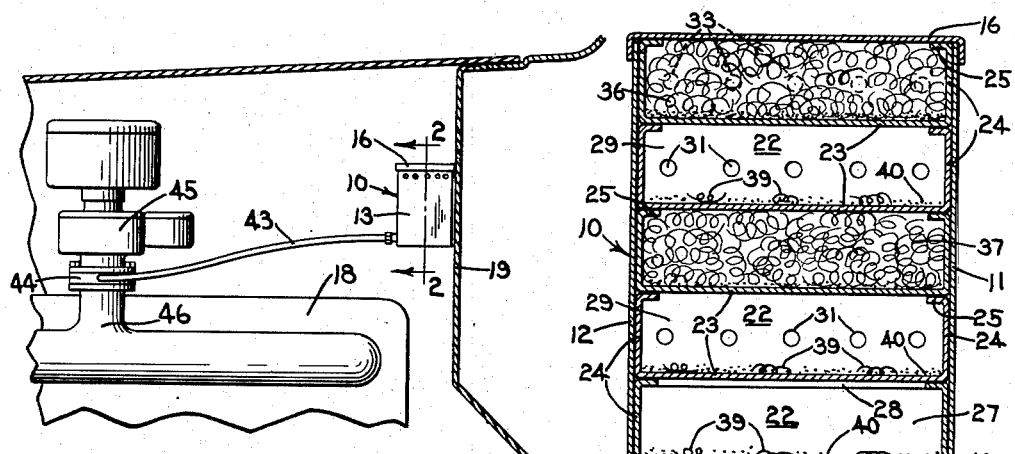
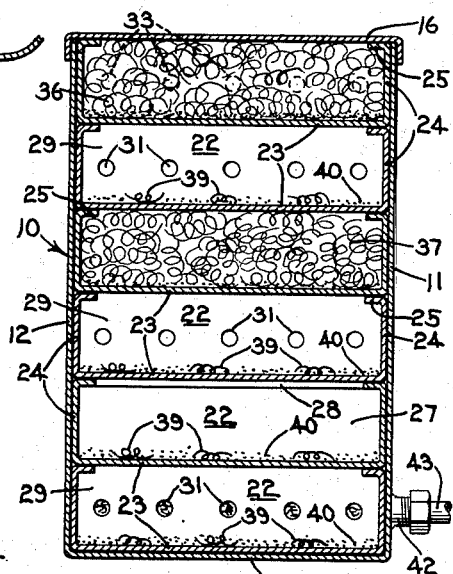
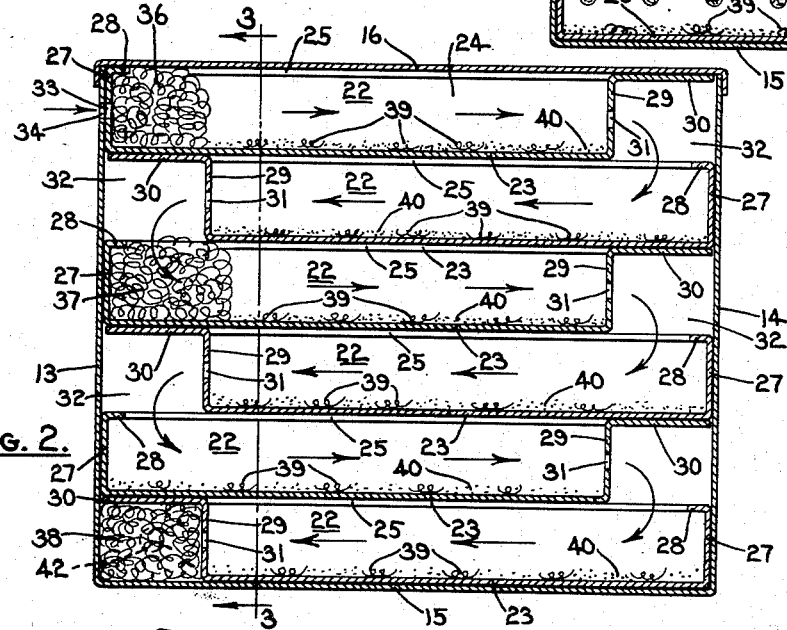
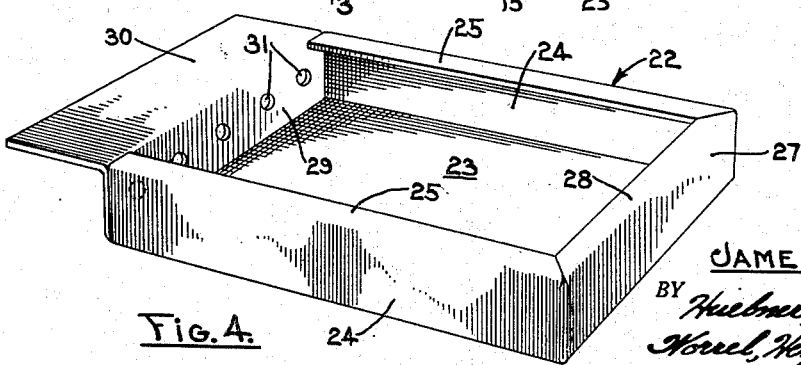
INVENTOR
JAMES H. LUNDY
ATTORNEYS

United States Patent Office 2,695,680
Patented Nov. 30, 1954

2,695,680

AIR PRECONDITIONER FOR INTERNAL-COMBUSTION ENGINES

James H. Lundy, Fresno, Calif., assignor of sixteen per cent to Raymond E. Hergenrader, Fowler, and sixteen per cent to W. Walter Young, Plymouth, Calif.

Application February 28, 1949, Serial No. 78,874

2 Claims. (Cl. 183—49)

The present invention relates to air filters for internal combustion engines and more particularly to such a filter conducive to improved combustion of fuel within such engines and a method for achieving the same purpose.

Historically the quest for increased efficiency in internal combustion engines has largely involved increasing the compression ratio of such engines and improving the fuel employed therein. An obvious manner of increasing efficiency is to obtain more complete combustion of gases admitted to the cylinders of the engine. This is simply a matter of utilizing a maximum amount of the potential energy of the fuel employed. The well-known presence of carbon monoxide gas in the exhaust fumes of internal combustion engines is indicative of incomplete combustion and resulting inefficiency. Not only is the production of carbon monoxide by an internal combustion engine a serious inefficiency, but its toxic effects on animal life constitute a serious danger productive of unnecessary loss of life.

A further indication of inefficiency in internal combustion engines is the accumulation of carbon within the combustion chamber. The carbon frequently results from incomplete combustion of the fuel employed and may likewise result from lubricating oil working past the pistons into the combustion chambers. Accumulations of hard carbon have seriously objectionable wearing and abrading effects. The accumulation of carbon about the valves of such engines precludes their efficient operation and is productive of increased inefficiency. The accumulation of carbon on spark plugs often causes the spark plugs to perform inadequately their ignition function.

It is an object of the present invention, therefore, to increase the operating efficiency of internal combustion engines.

Another object is to provide a device adapted for use with internal combustion engines conducive to a more complete combustion of fuel employed therein.

Another object is to provide a device for internal combustion engines which is adapted to remove, by combustion, and to preclude the formation of, hard carbon in the combustion chambers.

Another object is materially to reduce the extent of carbon monoxide gas commonly found in exhaust gases from internal combustion engines.

Further objects of the present invention are to provide a device of the character and for the purposes set forth that is economical to manufacture, easy to install, simple and effective in its operation, and economical to maintain.

Other objects and advantages will become apparent in the subsequent description in the specification.

In the drawing:

Fig. 1 is a fragmentary view of an internal combustion engine, showing an intake manifold and carburetor thereof, said figure showing in section a fragmentary portion of an enclosing housing for the engine with a device of the present invention mounted on said housing in communication with the intake manifold of the engine.

Fig. 2 is a vertical, longitudinal, sectional view through the filter of the present invention taken on line 2—2 of Fig. 1.

Fig. 3 is a vertical, transverse, sectional view through the filter taken on line 3—3 of Fig. 2.

Fig. 4 is a perspective view of a single tray, a plurality of which trays are employed in the device of the present invention.

Referring in greater detail to the drawing:

The device of the present invention employs a housing 10, of any suitable material such as sheet metal, having substantial, parallel, opposite side walls 11 and 12; end walls 13 and 14; and a floor 15. The housing is open at the top. A cover 16, of sheet metal or other suitable material, is located over the open top of the housing and slidably fitted downwardly over the side walls 11 and 12 and end walls 13 and 14 of the housing. The cover is conveniently frictionally engaged with the housing so as to maintain its position in closing relation to the open top of the housing during operation and to provide substantially air-tight closing of the housing.

For purposes of illustration, an internal combustion engine is fragmentarily indicated at 18 in Fig. 1 as employed in an automobile having an adjacent dash panel 19. The housing 10 of the present invention may conveniently be mounted directly on the engine or in any other convenient location in close proximity thereto, such as upon the dash panel 19.

The housing 10 is substantially filled by a plurality of trays 22 located in stacked relation within the housing. The trays are of substantially similar construction of the form shown in Fig. 4. The individual trays are conveniently formed of a single sheet of metal or other suitable material and have bottom portions 23 with integral upwardly extended sides 24 substantially normal to the bottom portion. Each of the sides terminates in an inwardly extended flange 25 substantially parallel to the bottom portion. One end 27, of each of the trays, formed integrally with the bottom portion 23, is extended upwardly and terminates in an inwardly directed flange 28. The opposite end 29 of each of the trays is formed integrally with the bottom portion thereof, and extended upwardly and thence inwardly from the tray to provide a projection 30 employed for positioning purposes as will subsequently be described. The flanges 25 and 28, and the projection 30 preferably lie in a common plane substantially parallel to the bottom portion 23. A plurality of openings 31 are formed through the end portion 29 of each of the trays for the passage of air from each of the trays. The flanges 25 and 28 impart desired rigidity to the trays but more significantly in cooperation with the spacing projections 30 provide upwardly disposed surfaces in a common plane suited to the resting of superimposed trays thereon. Each of the trays 22 have an overall length approximating the length of the interior longitudinal dimension of the housing 10. The trays are preferably of an overall height such that a multiple of such height is substantially equal to the distance between the floor 15 of the housing 10 and the cover 16 when said cover is in closing relation to the housing.

As shown in Fig. 2, a plurality of trays are arranged in the housing in stacked relation, successive trays in the stack having their respective spacing projections oppositely endwardly directed relative to the housing. The ends 29 of each of the trays 20 are maintained in spaced relation to their respectively adjacent end walls of the housing 13 and 14 by the projections 30 abutting said end portions. A sufficient number of trays are employed substantially to fill the housing. So arranged, the trays define a zigzag air passage in the housing from the uppermost tray, through its end openings 31, downwardly into the immediate subjacent tray, endwardly and substantially horizontally through said subjacent tray, out said tray openings 31, downwardly into the next tray, and so on until the bottom-most tray is reached and thence outwardly through said bottom-most tray and openings 31. The uppermost tray has a plurality of intake openings 33 formed through its end 27 and another plurality of openings 34 is formed through the end wall 13 of the housing 10 in juxtaposition thereto for the passage of air into the uppermost tray from exteriorly of the housing 10.

Inspection of Fig. 2 indicates that air passes into the uppermost tray, through the openings 33 in its end 27, and into successively subjacent trays downwardly through the open tops thereof adjacent to the ends 27. For purposes of convenience the end portions of the trays adjacent the ends 27 are referred to as intake end portions.

For mechanical filtering purposes, quantities of metal filter material 36, such as copper wool, are located in the intake end portions of the trays preferably in sufficient extent substantially to fill said end portions from the ends 27 for a distance in excess of the length of the projections 30. Thus, air passing into the uppermost tray through the openings 33 is filtered by passing through the metallic filter material, and preliminary to passage through the housing is filtered of dust and other extraneous material suspended in the air. Said metallic filter material may be positioned in the intake end portion of each of the trays or in only selected trays, as shown in Figs. 2 and 3. Such metallic filter material is preferably employed in the uppermost tray, periodically in subjacent trays, and between the end portion 29 of the lowermost tray and the end wall 13 of the housing 10 adjacent thereto and below the lowermost tray's respective projection 30, substantially filling the cavity defined by the projection 30, end wall 13, floor 15, and end 29 of the tray, as shown at 38.

Each of the trays contains a mixture of fine copper and zinc shavings, indicated by the reference numeral 39 and a quantity of crystals 40, presently more fully described, said mixture of shavings and crystals being sufficient to substantially cover the bottom of each of the trays. The uppermost tray and alternately subjacent trays contain said copper and zinc shavings and crystals of tartaric acid ($H_2C_4H_4O_6$), zinc chloride ($ZnCl$), and a minute quantity of sodium chloride ($NaCl$). The tartaric acid crystals and the zinc chloride crystals are in substantially equal volume. The intermediate trays contain the copper and zinc metallic shavings and crystals including ammonium chloride ($NH_4Cl$), zinc chloride ($ZnCl$), and a minute quantity of sodium chloride ($NaCl$). The mixture of metallic shavings and crystals in the trays comprise the materials defined in uncombined condition. There are apparently no critical quantities of the various materials, it being preferred that each of the materials be in substantial equal quantity with the exception of the sodium chloride which is present in substantially smaller quantities in each of the trays.

The selection of the materials was entirely by trial and error and their effects, subsequently described, discovered by chance. It is not known why the particular materials set forth function as they do nor why they fail to function if any one thereof is removed. Their operation may be chemical, electrical, catalytic, or even mechanical. The results achieved have been well substantiated by exhaustive control tests, but the reasons for the achievement of the results still lie beyond the knowledge of the inventor. Further, the inventor has been unable to discover any equivalents for the copper and zinc shavings or for the tartaric acid, zinc chloride, ammonium chloride, or sodium chloride. It is to be understood that the crystal materials may also be employed in powdered or comminuted form.

A nipple 42 is secured to the side wall 11 of the housing 10 in communication with the interior of the housing at the cavity substantially filled by the copper wool 38. An air conduit 43 is connected at one end to the nipple 42 and at its other end to an adapter 44 or other structure intermediate a carburetor 45 and an intake manifold 46 of the internal combustion engine 18. The conduit 43 completes an air passage from the openings 34 through the housing 10 to the interior of the intake manifold 46 and thence to the combustion chamber or chambers of the engine. As is well known, the intake manifold of an internal combustion engine is at a pressure substantially less than atmospheric pressure. Thus, atmospheric pressure forces air through the zigzag path defined by the trays 22 in the housing 10, passing through the copper wool 36 and 38 and over the copper and zinc shavings 39 and crystals 40. It has been discovered that there is no substantial reduction in the quantity of crystals in the trays or in the metallic shavings even during protracted periods of operation of the device of the present invention in connection with the internal combustion engine of an automobile. Such tests have extended beyond a year of normal automotive use covering tens of thousands of miles.

Operation

The operation of the device of the present invention is believed to be clearly apparent and is briefly summarized at this point. Operation of the internal combustion engine 18 causes atmospheric pressure to force air through the openings 34, through the copper wool 36 and 38, over the metallic shavings and crystals described, and into the intake manifold of the engine. In the intake manifold this preconditioned air is mixed with the mixture of fuel and air drawn into the intake manifold 46 from the carburetor 45 in the usual way. When an internal combustion engine which has been operated for a considerable period of time prior to its equipment with a device of the present invention and thus contains considerable quantities of carbon, is equipped with said device, it has been discovered that substantially improved initial effect of the device may be achieved by slightly moistening the mixture of metallic shavings 39 and crystals 40 contained in each of the trays. The moistening is preferably accomplished by spraying a fine fog of water over the materials in quantities insufficient to dissolve the crystals. Here again no explanation can be offered by the inventor of the increased effectiveness of the materials in the trays incident to the addition of minute quantities of water, the markedly improved results achieved being thoroughly tested by experimentation but based upon no particular theory of operation now known.

As the air passes through the copper wool 36 and 38 it is mechanically strained and dust and other extraneous material removed therefrom. A passage of such air over successive trays alternately containing copper and zinc shavings 39 and tartaric acid, zinc chloride and sodium chloride crystals and copper and zinc shavings and ammonium chloride, and sodium chloride crystals accomplishes a synergistic effect upon the air which when it reaches the combustion chamber, effects oxidation and removal of carbon within the internal combustion chamber. Extensive tests indicate that the carbon is effectively removed without burning of the valves in the engine. Further, and at least equally significantly, such preconditioned air admitted to the intake manifold materially increases the extent of the combustion of the fuel employed. Thus, carbon existing in the motor at the time of the installation of the device of the present invention is effectively removed and the formation of subsequent carbon deposits substantially reduced or eliminated. The improved combustion of the fuel is not only evident in the elimination of carbon within the motor, but analysis of exhaust fumes from internal combustion engines equipped with the device of the present invention reveals that said exhaust is substantially free of carbon monoxide. This has the incidental advantage of eliminating this highly toxic constituent of exhaust fumes. Still further, the increased efficiency of combustion of the fuel in an internal combustion engine is evident in increased power developed by such an engine when equipped with the device of the present invention, automobile engines being so equipped giving substantially improved mileage over that previously attained by such engines.

Although I have herein shown and described my invention in what I have conceived to be the most practical and preferred embodiment, it is recognized that departures may be made therefrom within the scope of the invention, which is not to be limited to the details disclosed herein, but is to be accorded the full scope of the claims so as to embrace any and all equivalent devices and systems.

Having described my invention, what I claim as new and desire to secure by Letters Patent is:

1. In a device adapted to precondition air for use in internal combustion engines, a holder comprising a housing having substantially parallel opposite side walls, end walls, a bottom and a cover, said housing having an air inlet formed through an end wall adjacent to the cover and an air outlet through an end wall adjacent to the bottom; and a plurality of open top trays fitted within the housing in stacked relation, each of said trays being formed of a single piece of sheet material and having a pair of spaced side walls fitted between the side walls of the housing, a substantially air tight bottom, a pair of end walls more closely spaced than the end walls of the housing, both end walls of the topmost of said trays being perforated, alternate opposite end walls of other stacked trays being perforated, a projection endwardly extended from the upper edge of the perforated end walls maintaining its respective end wall in space relation to the adjacent end wall of the housing, and flanges inwardly turned at the upper edge of the side walls for support of superimposed trays rested thereon.

2. An air filter for internal combustion engines comprising a housing having end walls and side walls defining a substantially air tight compartment having an air inlet and an air outlet, a plurality of open top trays having side walls fitted between the side wall of the housing arranged in stacked relation within the housing, said trays having end walls adjacent to the end walls of the housing, both end walls of the topmost of said trays being perforated, the alternate end walls of the other superimposed trays being perforated for the passage of air therethrough, projections integral with the perforated end walls of the trays maintaining their respective end walls in spaced relation with their respectively adjacent end walls of the housing: and porous filter material provided within the trays.

References Cited in the file of this patent

UNITED STATES PATENTS

| Number | Name | Date |
|---|---|---|
| 438,464 | Benson | Oct. 14, 1890 |
| 1,205,264 | Rogers | Nov. 21, 1916 |
| 1,225,269 | Paul et al. | May 8, 1917 |
| 1,489,831 | Jordahl | Apr. 8, 1924 |
| 1,669,181 | Walter | May 8, 1928 |
| 1,878,401 | John | Sept. 20, 1932 |
| 1,925,971 | Simon | Sept. 5, 1933 |
| 2,216,477 | O'Sullivan | Oct. 1, 1940 |